United States Patent
Sharma et al.

(10) Patent No.: US 10,382,580 B2
(45) Date of Patent: Aug. 13, 2019

(54) SCALING PERSISTENT CONNECTIONS FOR CLOUD COMPUTING

(71) Applicant: Hewlett Packard Enterprise Development LP, Houston, TX (US)

(72) Inventors: Puneet Sharma, Palo Alto, CA (US); Wenjie Lin, Palo Alto, CA (US); David Lee, Atherton, CA (US); Subramoniam Iyer, Newark, NJ (US); Ajay Gupta, Bangalore (IN); Sarbajit Chatterjee, Bangalore Karnataka (IN); Deepti Sharma, Bangalore Karnataka (IN)

( * ) Notice: Subject to any disclaimer, the term of this patent is extended or adjusted under 35 U.S.C. 154(b) by 76 days.

(21) Appl. No.: 15/500,237

(22) PCT Filed: Aug. 29, 2014

(86) PCT No.: PCT/US2014/053552
§ 371 (c)(1),
(2) Date: Jan. 30, 2017

(87) PCT Pub. No.: WO2016/032532
PCT Pub. Date: Mar. 3, 2016

(65) Prior Publication Data
US 2017/0279922 A1  Sep. 28, 2017

(51) Int. Cl.
*H04L 29/06* (2006.01)
*G06F 21/00* (2013.01)
(Continued)

(52) U.S. Cl.
CPC ........ *H04L 67/325* (2013.01); *H04L 12/6418* (2013.01); *H04L 63/0823* (2013.01);
(Continued)

(58) Field of Classification Search
CPC .............. H04L 67/325; H04L 65/1066; H04L 63/0823; H04L 67/1097; H04L 69/28; H04L 69/40; H04L 12/6418
See application file for complete search history.

(56) References Cited

U.S. PATENT DOCUMENTS 6,463,141 B1 * 10/2002 Tuunanen ............ H04Q 3/0037
379/201.05
8,190,748 B1  5/2012 Watson et al.
(Continued)

OTHER PUBLICATIONS

Gunaratne, C et al, "Managing energy consumption costs in desktop PCs and LAN switches with proxying. . . ", Aug. 24, 2005.

*Primary Examiner* — Lisa C Lewis
(74) *Attorney, Agent, or Firm* — Brooks, Cameron & Huebsch, PLLC

(57) ABSTRACT

Examples relate to scaling persistent connections for cloud computing. In some examples, a data packet is used to determine connection information of the first connection. At this stage, server portion of the first connection is closed by using the connection information to send a close command to the cloud server. In response to a keepalive signal from the client computing device, the connection information is used to send a keepalive response to the client computing device to maintain a client portion of the first connection. In response to a service request from the client computing device, a service notification including the service request is sent to the client computing device, where the client computing device initiates a second connection with the cloud server to process the service request.

12 Claims, 3 Drawing Sheets

(51) Int. Cl.
  *H04L 29/08* (2006.01)
  *H04L 12/64* (2006.01)
  *H04L 29/14* (2006.01)

(52) U.S. Cl.
  CPC ...... *H04L 65/1066* (2013.01); *H04L 67/1097* (2013.01); *H04L 69/28* (2013.01); *H04L 69/40* (2013.01)

(56) References Cited

U.S. PATENT DOCUMENTS

| | | |
|---|---|---|
| 2002/0055980 A1 | 5/2002 | Goddard |
| 2002/0119783 A1* | 8/2002 | Bourlas ............. H04W 72/1252 455/453 |
| 2004/0018843 A1* | 1/2004 | Cerwall ............... H04W 72/02 455/450 |
| 2006/0034303 A1* | 2/2006 | Ikonen .................. G06Q 30/06 370/401 |
| 2009/0216885 A1* | 8/2009 | Brunswig ............. G06Q 10/00 709/227 |
| 2009/0252072 A1 | 10/2009 | Lind et al. |
| 2011/0247063 A1* | 10/2011 | Aabye .................. G06F 21/445 726/6 |
| 2011/0264800 A1* | 10/2011 | Allred .................. H04L 29/125 709/224 |
| 2011/0286373 A1 | 11/2011 | Herzog |
| 2012/0069394 A1 | 3/2012 | Ono |
| 2012/0110173 A1 | 5/2012 | Luna et al. |
| 2013/0156167 A1 | 6/2013 | Talwar et al. |
| 2014/0016554 A1 | 1/2014 | Lee |
| 2014/0056313 A1* | 2/2014 | Wada ..................... H04L 63/02 370/463 |
| 2014/0068038 A1 | 3/2014 | Brook et al. |
| 2014/0293324 A1* | 10/2014 | Asthana ................ G06F 3/1238 358/1.15 |
| 2015/0026213 A1* | 1/2015 | Hegde ................ G06F 17/3048 707/781 |

* cited by examiner

SCALING PERSISTENT CONNECTIONS FOR CLOUD COMPUTING

BACKGROUND

Recently, cloud applications have seen tremendous growth as Internet connections improve with respect to availability and speed. With smartphones, tablets, laptops, and other portable devices, user devices often need to be persistently connected with the cloud to receive services and notifications related to service delivery. After the initial connection establishment, the majority of these persistent connections between connected user devices and cloud are idle most of the time but expect timely service delivery after an event of user interest occurs.

BRIEF DESCRIPTION OF THE DRAWINGS

The following detailed description references the drawings, wherein.

DETAILED DESCRIPTION

Figure 1:
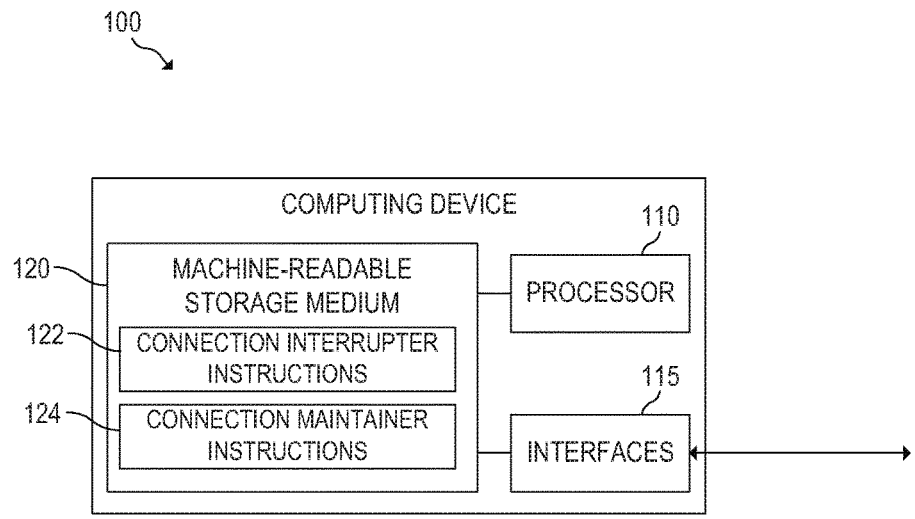
FIG. 1 is a block diagram of an example networking device for scaling persistent connections for cloud computing.

As discussed above, cloud applications often involve a large number of persistent connections, between the cloud server and client devices, that are idle a majority of the time. Specifically, a cloud application may provide services to a large number of clients whose devices are behind network address translation (NAT) devices and firewalls. In this case, the client devices can initiate a connection with the cloud server, but the cloud server is incapable of initiating connection to the client devices directly. The client devices can connect to the cloud application over a transport connection (e.g. Transport Control Protocol (TCP)) or in a secure manner (e.g. transport layer security (TLS)/secure sockets layer (SSL)) and persist the connection. If the connection is lost, a client device is configured to then attempt to reconnect with the cloud application. On the server-side and behind the firewall and load balancer, each cloud server hosts a proportion of the connections, where the connections are bidirectional such that clients can actively submit data to the cloud application while the cloud application can push its service to the client devices.

Examples disclosed herein use a connection parking scheme that improves the scalability of a cloud application. Connection parking optimizes resources that are dedicated to maintaining idle connections of client devices. After the initial connection has been fully established, the connection parking scheme releases resources reserved for idle connections by partially closing the connectivity of idle connections on the server-side. In some cases, the connections between client devices and the cloud server uses TCP and, in others cases, TLS/SSL is used as well.

As discussed above, the client device is the initiator of a connection to the cloud server. The connection can then be used to exchange identity information and to authenticate the client device. In the case of a printing device, other information can be exchanged over the connection to complete the connection initialization/establishment such as printer registration, instruction pages, print jobs, scanned documents, printer resources, etc. In this case, the connection is typically persistent to allow for real-time status exchanges such as real-time print job delivery from the cloud to the printer in a timely manner. After the connection initialization and establishment is complete, the client device periodically sends a keep alive signal such as XMPP-ping to avoid the connection from being timed out due to inactivity. As the number of connected client devices (e.g., printers, storage devices, etc.) increases, the resources to maintain a persistent connection for each device such as printer increases and adversely affects the scalability of the cloud server.

In some of the examples described herein to conserve resources and partially close connections, initially, an intercepted data packet or a sequence of data packets is used to determine and maintain connection state information of the first connection. At this stage, server portion of a first connection is partially closed (on the server-side) by using the connection information to send a close command to the cloud server. In response to a keepalive signal from the client computing device, the connection information is used to create a keepalive response that mimics the normal cloud server response. The keepalive response is sent to the client computing device to maintain the client portion of the first connection. In response to a service request from the client computing device, a service notification including the service request is sent to the client computing device, where the client computing device initiates a second connection with the cloud server to process the service request.

Referring now to the drawings, FIG. 1 is a block diagram of an example computing device 100 for scaling persistent connections for cloud computing. The example computing device 100 may be a server, a networking device, a desktop computer, or any other computing device suitable for scaling persistent connections for cloud computing. In the embodiment of FIG. 1, computing device 100 includes processor 110, interfaces 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124 to enable scaling persistent connections for cloud computing, as described below. As an alternative or in addition to retrieving and executing instructions, processor 110 may include one or more electronic circuits comprising a number of electronic components for performing the functionality of one or more of instructions 122, 124.

Interfaces 115 may include a number of electronic components for communicating with other computing devices. For example, interfaces 115 may be wireless interfaces such as wireless local area network (WLAN) interfaces and/or physical interfaces such as Ethernet interfaces, Universal Serial Bus (USB) interfaces, external Serial Advanced Technology Attachment (eSATA) interfaces, or any other physical connection interface suitable for communication with other computing devices. In operation, as detailed below, interfaces 115 may be used to send and receive data to and from other computing devices.

Machine-readable storage medium 120 may be any electronic, magnetic, optical, or other physical storage device that stores executable instructions. Thus, machine-readable storage medium 120 may be, for example, Random Access Memory (RAM), Content Addressable Memory (CAM), Ternary Content Addressable Memory (TCAM), an Electrically-Erasable Programmable Read-Only Memory (EEPROM), flash memory, a storage drive, an optical disc, and the like. As described in detail below, machine-readable storage medium 120 may be encoded with executable instructions for scaling persistent connections for cloud computing.

Connection interrupter instructions 122 intercept data packets between client computing devices and cloud applications. For example, the client computing devices may be accessing a cloud application over the Internet. In this example, computing device 100 may be associated with a networking device in a network that provides access to the cloud application. The data packets may be processed in a queue to determine how the data packets should be routed. Specifically, if the server portion of a connection between the cloud application and the client computing device should be partially closed (i.e., parked), the data packet can be routed as described below.

Connection interrupter instructions 122 also determines if there are any pending service requests being handled by the cloud server. Service requests are received from users of the cloud application to consume services provided by cloud computing device (e.g., cloud printing, cloud storage, etc.). If there is a pending service request, connection interrupter instructions 122 can delay closing the server portion of the connection until the service request has been processed.

Connection maintainer instructions 124 closes the server portion of connections between the cloud application and client computing devices that are designated for parking. Because the server portion of the connections is closed, resources of cloud server(s) associated with the cloud application can be freed to improve the scalability of the cloud server(s). The server portion of the connections can be closed by, for example, by creating a connection close packet using connection information extracted from the intercepted data packets. While the server portion of the connections is closed, the client portion of the connections is maintained as described below Connection maintainer instructions 124 also handles keepalive protocol messages from the client computing devices and appropriate response back to the client computing devices. The keepalive protocol defines messages to be transmitted between computing devices to maintain their connection. The client computing devices may send keepalive messages at regular intervals to the cloud application to maintain their connections and prevent them from being timed out due to inactivity. Because the keepalive messages are intercepted, connection maintainer instructions 124 can send keepalive responses to the client computing devices to maintain the connections. In this manner, computing device 100 is able to maintain the client portion of connections to the cloud application without using resources of the cloud server(s).

In response to receiving a service notification from the cloud server, connection maintainer instructions 124 closes the client portion of the connection. The service notification is created by the cloud server after receiving a service request (e.g., cloud printing, cloud storage, etc.) from a user of the cloud application. Since the connection is now completely closed, the client computing device can then create a new connection with the cloud application to process the service request.

Figure 2:
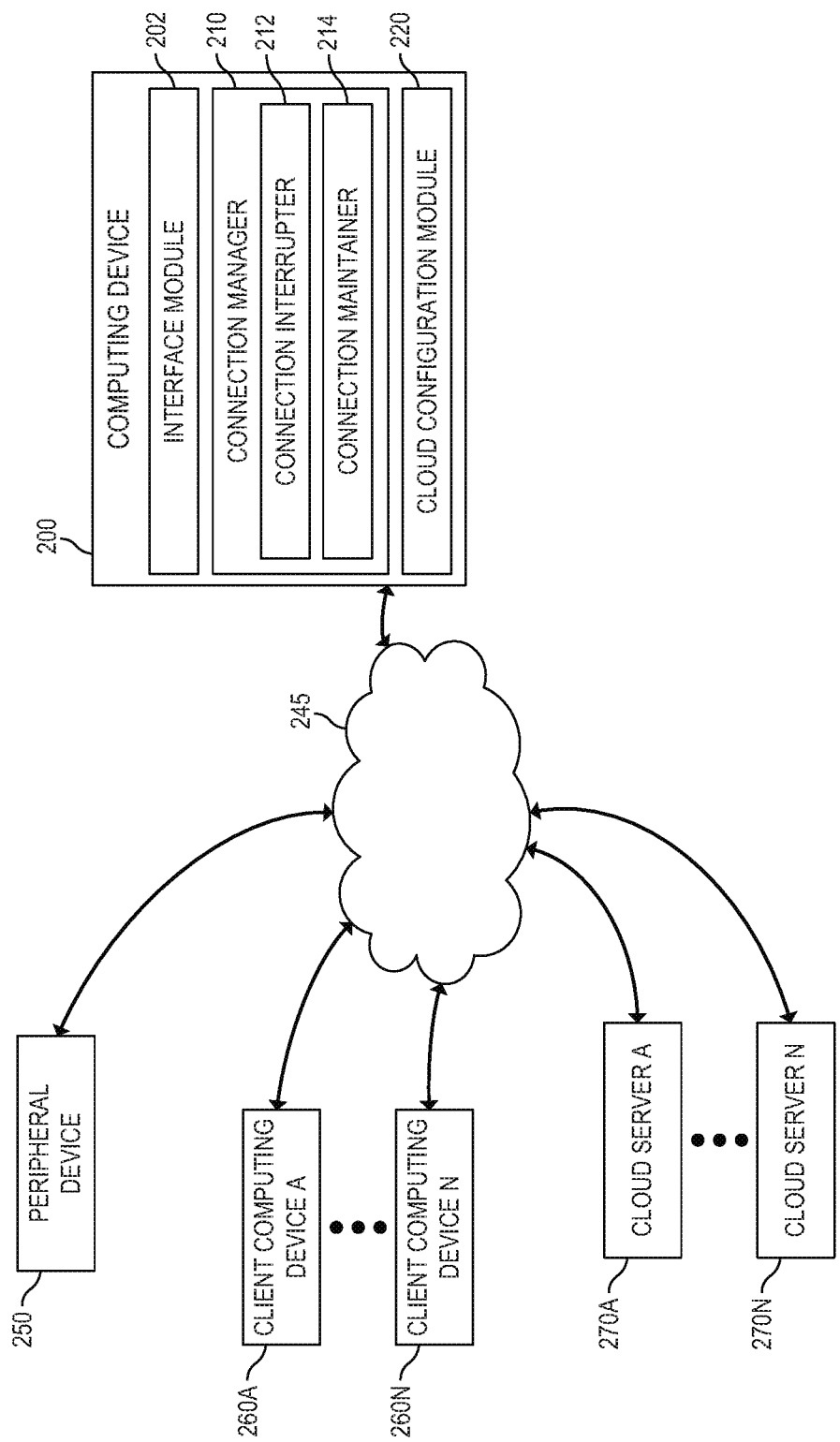
FIG. 2 is a block diagram of an example system for scaling persistent connections for cloud computing.

FIG. 2 is a block diagram of an example system 200 including computing device 200 interacting with client computing devices 260A, 260N and cloud servers 270A, 270N to provide cloud services. The components of computing device 200 may be similar to the corresponding components of computing device 100 described with respect to FIG. 1.

As with computing device 100 of FIG. 1, computing device 200 may be a desktop computer, a server, a notebook computer, a networking device, or any other device suitable for executing the functionality described below. As detailed below, computing device 200 may include a series of modules 202-220 for scaling persistent connections for cloud computing.

Interface module 202 may manage communications with client computing devices 260A, 260N and cloud servers 270A, 270N. Specifically, the interface module 202 may initiate connections with the various computing devices and then send or receive data to/from the devices. In some cases, all or a portion of the data may be stored locally on computing device 200 so that the functionality described below can be performed without the use of network 245.

Connection manager 210 may manage connections between client computing devices 260A, 260N and cloud servers 270A, 270N. In some cases, rather than being provided by a separate device like computing device 200 in this example, connection manager 210 can be located on cloud servers 270A, 270N. Although the components of connection manager 210 are described in detail below, additional details regarding an example implementation of connection manager 210 are provided above in connection with instructions 122-124 of FIG. 1.

Connection interrupter 212 handles traffic that is intercepted between client computing devices 260A, 260N and cloud servers 270A, 270N. Specifically, data packets from the client computing devices 260A, 260N to determine if they should be routed to cloud servers 270A, 270N or be handled by computing device 200. For example, if a connection of a client computing device (e.g., client computing device A 260A, client computing device N 260N) has been idle for a predetermined amount of time, the data packet may be processed by computing device 200 as described below. Further, connection interrupter 212 is configured to close the server portion of the connection if it determines that there are no pending service requests for the connection being processed by cloud servers 270A, 270N. If there is a pending service request, connection interrupter 212 can wait for the service request to be processed so that the connection is idle before the server portion of the connection is closed.

In some cases, the connections between client computing devices 260A, 260N and cloud servers 270A, 270N may be secure connections. For example, the connections can be established according to the TLS or SSL protocol. When secure connections are used, computing device 200 also includes a premaster secret (not shown) for decrypting messages from the client computing devices 260A, 260N, where the premaster secret is encrypted using a server certificate of the cloud servers 270A, 270N.

In the case of TLS, computing device 200 includes a shadow TLS server engine to impersonate a similar engine of the cloud server (e.g., cloud server A 270A, cloud server N 270N). A shadow TLS client engine is also forked, where the shadow client engine is temporary because no data packets are sent from the cloud server (e.g., cloud server A 270A, cloud server N 270N) after the server portion of a connection is closed.

Connection maintainer 214 manages connections between computing devices 260A, 260N and cloud servers 270A, 270N. If a connection is designated for suspension (e.g., extended inactivity, diminishing resources on the cloud servers 270A, 270N, etc.), connection maintainer 214 sends a close command to the associated cloud server (e.g., cloud server A 270A, cloud server N 270N) to close the server portion of the connection. In this case, connection maintainer 214 is configured to respond to keepalive messages from the client computing device (e.g., client computing device A 260A, client computing device N 260N) to maintain the client portion of the connection. Connection maintainer 214 may be a lightweight module that uses fewer resources than similar functionality of a cloud server (e.g., cloud server A 270A, cloud server N 270N) because connection maintainer is not configured to provide complete set of cloud services.

For TCP, the state of connections is stored in a database that is used to share information between the cloud servers 270A, 270N and connection maintainer 214. Connection interrupter 212 monitors all ACK messages including SYN_ACK, which indicates the establishment of a new connection. After the connection between the cloud server (e.g., cloud server A 270A, cloud server N 270N) and the client computing device (e.g., client computing device A 260A, client computing device N 260N) has been established, connection maintainer 214 sends a FIN packet to the cloud server to close the server portion of the connection and release associated resources. In the normal TCP connection close behavior, the cloud server responds by sending an acknowledgement for the FIN, back to the client computing device; however, connection interrupter 212 filters out the FIN sent from the cloud server to the client computing device at server side. As a result the client computing device as well as network address translation devices (NATs) in between do not terminate the client portion of the connection. TCP packets with the same session information can still be forwarded by NATs and accepted by the client computing device.

To maintain the connectivity, connection maintainer 214 periodically scans the connection information from the database for sending keepalive messages to the client computing device, masquerading as the cloud server. The keepalive messages are sent using a single raw socket to reduce the amount of resources required for maintaining connection state. The ACK response messages by the client computing devices 260A, 260N enable the shadow engine to update printer session information in the database. Connection maintainer 214 also captures other TCP connection information such as timestamp, sequence number, etc., which are used to create a valid masquerading packet that is acceptable to the client computing device.

The TCP connection information can be used for masquerading period request-response sequences between the cloud server and the client computing device. For instance, there are two kinds of keepalive message exchanges in the current CPG implementation. The first exchange comprises of a whitespace message to detect if a TCP session exists and is active. The second is a XMPP ping to detect if the XMPP session is normal. For this exchange, the client computing device may be configured to periodically send an XMPP ping packet to the cloud server. Connection maintainer 214 also responds to these keepalive messages from the client computing device so that the client portion of the connection with the cloud server. When a service request for a new job for a particular client computing device is received, the database is updated to indicate a pending job for the client computing device. At the same time, connection maintainer 214 sends a RN packet to the client computing device to terminate the client portion of the TCP connection. When the client computing device attempts to reconnect to the cloud server, the pending job is transferred to the client computing device. Note that connection interrupter 212 does not terminate the server portion of the TCP connection if there is a pending job for a particular client computing device.

For TLS, TLS parking does not occur until a CLIENT HELLO message is observed, which is the beginning of TLS handshake. During the TLS handshake, messages from the client computing devices 260A, 270N are directed to the shadow TLS server engine and the parameters in the payloads are set in the shadow TLS client engine. Similarly, messages from the cloud server 270A, 270N are directed to the shadow TLS client engine and the parameters set in the shadow TLS server engine. During these operations, the shadow engines maintain the same state as the actual engines of the cloud server 270A, 270N. In a client key exchange message sent by client computing devices 260A, 260N, the previously shared masterkey is already encrypted. In this case, the shadow TLS client engine cannot learn the secret directly from the packets and instead obtains the key from the shadow TLS server engine, which has decrypted the message and recorded the key. After the handshake, connection maintainer 214 can learn decrypted client information from the shadow TLS engines.

Similar to TCP, TLS suspension can be in active mode or passive mode, where the keepalive messages can be application specific. In this case when the server portion of the connection is closed, no packets are sent from the cloud server, and the shadow TLS client engine can be stopped/destroyed after the first keepalive message.

TLS suspension should also account for our-of-order packets. Once encrypted, a TLS message can be too long to fit in a single TCP packet; thus, the TCP packet is fragmented and then sent through the TCP layer. The shadow TLS engines monitors the packets, but the shadow TLS engines reside on top of the raw socket rather than on reliable TCP connections. Unlike the actual TLS server engine in cloud servers 270A, 270N, the shadow TLS server engines should address out-of-order packets in solidarity, which is performed using TCP if present. Two doubly linked list for each TLS connection are maintained, one for the shadow server engine and the other for the shadow client engine. Each packet is processed using the list and then inserted according to a corresponding sequence number. Packets of the connection are buffered in the linked list until a complete record is received. In a wireless environment, connection establishment may produce longer linked lists. However, after a server portion of connection is closed, the linked list should be shorter because keepalive messages can typically fit in a single TCP packet.

Connection maintainer 214 is also configured to process service notifications from cloud servers 270A, 270N. A service request is directed at a cloud server (e.g., cloud server A 270A, cloud server N 270N) and requests a cloud service to be fulfilled by a client computing device (e.g., client computing device A 260A, client computing device N 260N). Because computing device 200 is not configured to provide cloud services, the service request should be obtained for processing directly from a cloud server (e.g., cloud server A 270A, cloud server N 270N) over a new connection by the client computing device (e.g., client computing device A 260A, client computing device N 260N). Accordingly, connection maintainer 214 closes the client portion of the connection to trigger the client computing device (e.g., client computing device A 260A, client computing device N 260N) to initiate a new connection with the cloud server (e.g., cloud server A 270A, cloud server N 270N) and process the service request. Cloud services can manage services such as cloud printing and cloud storage that are provided by client computing devices 260A, 260N.

Client computing devices 260A, 260N may be a desktop computer, a notebook computer, a tablet, a smartphone, a printer, a peripheral storage device, a camera, a refrigerator, a digital picture frame, or any other smart device suitable for providing a user with access to cloud-managed services. Any number of client computing devices 260A, 260N may exist and expect to maintain a persistent connection to cloud servers 270A, 270N (e.g., Internet of Things).

Cloud servers 270A, 270N may be desktop computers, servers, or other devices capable of providing cloud services. Cloud servers 270A, 270N may be distributed across any number of networks. In this case, a device similar to computing device 200 can be included in each network to provide the functionality described above. Cloud servers 270A, 270N may provide access to cloud services using various protocols such as extensible messaging and presence protocol (XMPP). XMPP is a messaging protocol that is defined in an open standard and based on extensible markup language (XML).

Cloud servers 270A, 270N are configured to handle service requests received from users of the cloud service. When a service request is received by a cloud server (e.g., cloud server A 270A, cloud server N 270N), the cloud server initially determines if it has an active connection with a related client computing device (e.g., client computing device A 260A, client computing device N 260N). If the cloud server does have an active connection, the cloud server can send the service request to the client computing device for processing. If the cloud server does not have an active connection, the cloud server can send a service notification to computing device 200 to notify connection maintainer 214 to close the client portion of the connection as described above.

In other cases, the functionality described above can be provided by a single cloud server.

Figure 3:
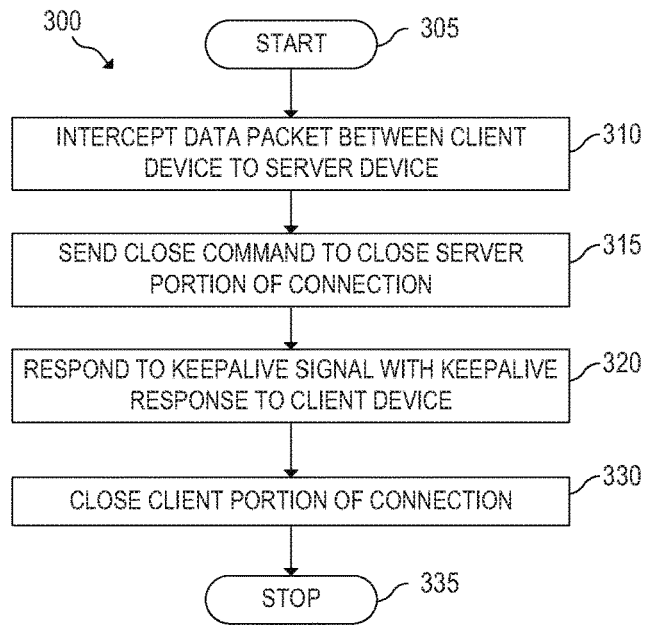
FIG. 3 is a flowchart of an example method for execution by a computing device for scaling persistent connections for cloud computing.

FIG. 3 is a flowchart of an example method 300 for execution by a computing device 100 for scaling persistent connections for cloud computing. Although execution of method 300 is described below with reference to computing device 100 of FIG. 1, other suitable devices for execution of method 300 may be used such as computing device 200 of FIG. 2. Method 300 may be implemented in the form of executable instructions stored on a machine-readable storage medium, such as computer readable medium 120 of FIG. 1, and/or in the form of electronic circuitry.

Method 300 may start in block 305 and continue to block 310, where computing device 100 intercepts data packets between a client computing device and a cloud server. The data packets may be processed in a queue to determine how the data packets should be routed or processed. In block 315, computing device 100 sends a close command to close a server portion of the connection between the client computing device and the cloud server.

In block 320, computing device 100 responds to a keepalive signal from the client computing device with a keepalive response. The keepalive response maintains the client portion of the connection. In block 330, computing device 100 closes the client portion of the connection in response to receiving a service notification from the cloud server. The service request was initially submitted by the client computing device to the cloud server, but because the server portion of the connection is closed, the cloud server notifies computing device 100 so that a new connection can be created between the cloud server and the client computing device to process the service request. Method 300 may then continue block 335, where method 300 may stop.

Figure 4:
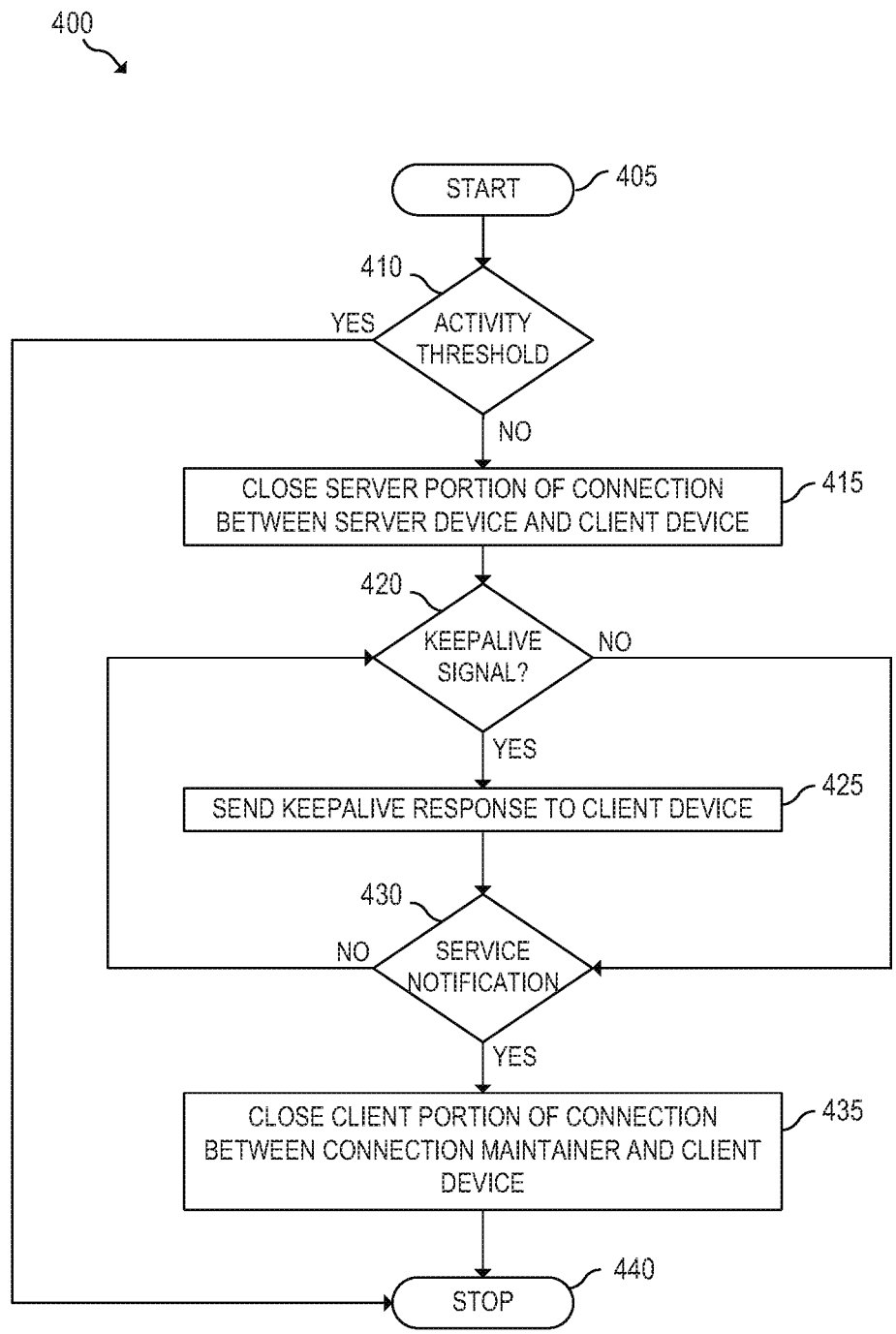
FIG. 4 is a flowchart of an example method for execution by a computing device for maintaining persistent connections for cloud computing.

FIG. 4 is a flowchart of an example method 400 for execution by a computing device 200 for maintaining persistent connections for cloud computing. Although execution of method 400 is described below with reference to computing device 200 of FIG. 2, other suitable devices for execution of method 400 may be used. Method 400 may be implemented in the form of executable instructions stored on a machine-readable storage medium and/or in the form of electronic circuitry.

Method 400 may start in block 405 and continue to block 410, where computing device 200 determines if an activity threshold is satisfied. For example, if a connection between a client computing device and a cloud server is idle for a preconfigured amount of time, computing device 200 can determine that the activity threshold for the connection is not satisfied.

If the activity threshold is satisfied (i.e., the connection is active enough to warrant maintaining by the cloud server), method 400 may proceed to block 440 and stop. If the activity threshold is not satisfied, computing device 200 closes a server portion of the connections between the cloud server and the cloud computing device in block 415. In block 420, computing device 200 determines if a keepalive signal has been received. If no keepalive signal have been received, method 400 proceeds to block 430 to determine if a service notification has been received from the cloud server. If a keepalive signal has been received, computing device 200 sends a keepalive response to the client computing device that submitted the keepalive signal in block 425.

In block 430, computing device 200 determines if a service notification has been received. If a service notification has not been received, method 400 returns to block 420 to determine if a keepalive signal has been received. If a service notification has been received, computing device 200 may close the client portion of the connection to prompt the client computing device to create a new connection with the cloud server. The client computing device can then process the service request using the new connection. At this stage, method 400 may continue block 440, where method 400 may stop.

The foregoing disclosure describes a number of examples for maintaining persistent connections for cloud computing. In this manner, the examples disclosed herein improve the scalability of cloud services by using an intermediary module to maintain connections. The intermediary module can reside on the cloud server or on an intermediary computing device such as a networking device.

We claim:

1. A system for scaling persistent connections for cloud computing, comprising:
    an interface to intercept a plurality of data packets of a first connection setup between a cloud server and a client computing device, wherein the first connection is a secure connection;
    a processor operatively connected to the interface, the processor to:
        use a data packet of the plurality of data packets to determine connection information of the first connection;
    close a server portion of the first connection by using the connection information to send a close command to the cloud server;
        a premaster secret encrypted using a server certificate of the cloud server to decrypt a keepalive signal and;

in response to the keepalive signal from the client computing device, use the connection information to send a keepalive response to the client computing device to maintain a client portion of the first connection; and in response to a service request from a user, close the client portion of the first connection, wherein the client computing device initiates a second connection with the cloud server to process the service request.

2. The system of claim 1, wherein the server portion of the first connection is closed after determining an activity threshold of the client computing device is not satisfied.

3. The system of claim 1, wherein the client computing device is a printing device and the cloud server is an extensible messaging and presence protocol (XMPP) server.

4. The system of claim 1, further comprising a shadow server engine that maintains a similar connection state as an actual server connection engine of the cloud server.

5. The system of claim 4, wherein the first connection is a TCP connection, and wherein the server portion and the client portion of the connection are closed with a FIN packet.

6. A method for scaling persistent connections for cloud computing, comprising:

intercepting a data packet of a plurality of data packets to extract connection information of a first connection between a cloud server and a client computing device, wherein the first connection is a secure connection;

after determining an activity threshold of the client computing device is not satisfied, closing a server portion of the first connection by using the connection information to send a close command to the cloud server;

decrypting a keepalive signal using a premaster secret encrypted using a server certificate of the cloud server and in response to the keepalive signal from the client computing device, using the connection information to send a keepalive response to the client computing device to maintain a client portion of the first connection; and in response to a service request from the client computing device, closing a client portion of the first connection, wherein the client computing device initiates a second connection with the cloud server to process the service request.

7. The method of claim 6, wherein the client computing device is a printing device and the cloud server is an extensible messaging and presence protocol (XMPP) server.

8. The method of claim 6, further comprising creating a shadow server engine that maintains a similar state as an actual server engine of the cloud server.

9. The method of claim 8, wherein the first connection is a TCP connection, and wherein the server portion and the client portion of the connection are closed with a FIN packet.

10. A non-transitory machine-readable storage medium encoded with instructions executable by a processor for scaling persistent connections for cloud computing, the machine-readable storage medium comprising instructions to:

intercept a data packet of a plurality of data packets to extract connection information of a first connection between an extensible messaging and presence protocol (XMPP) server and a printing device, wherein the first connection is a secure connection;

close a server portion of the first connection by using the connection information to send a close command to the XMPP server;

decrypt a keepalive signal using a premaster secret encrypted using a server certificate of the XMPP server, and in response to the keepalive signal from the printing device, use the connection information to send a keepalive response to the printing device to maintain a client portion of the first connection; and in response to a service request from the printing device, close a client portion of the first connection, wherein the printing device initiates a second connection with the XMPP server to process the service request.

11. The non-transitory machine-readable storage medium of claim 10, wherein the instructions are further to create a shadow server engine that maintains a similar state as an actual server engine of the XMPP server.

12. The non-transitory machine-readable storage medium of claim 11, wherein the first connection is a TCP connection, and wherein the server portion and the client portion of the connection are closed with a FIN packet.

\* \* \* \* \*